United States Patent Office 2,763,592
Patented Sept. 18, 1956

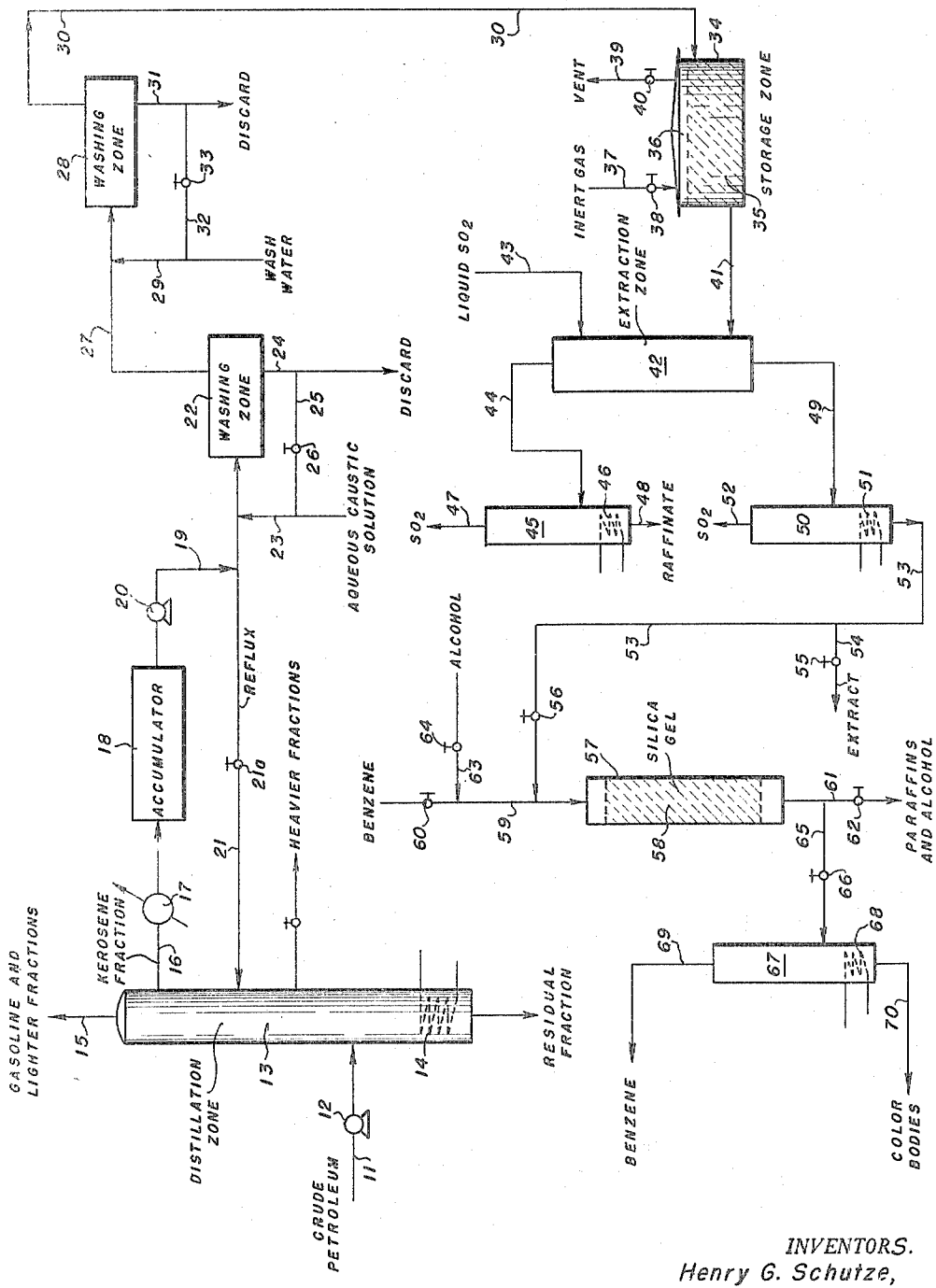

2,763,592

CAUSTIC WASHING, WATER WASHING AND SO₂ EXTRACTING KEROSENE WHILE EXCLUDING FREE OXYGEN

Boyd N. Hill and Henry G. Schutze, Baytown, Tex., assignors, by mesne assignments, to Esso Research and Engineering Company, Elizabeth, N. J., a corporation of Delaware Application July 27, 1953, Serial No. 370,425

10 Claims. (Cl. 196—14.47)

The presented invention is directed to a method for producing a kerosene of improved color. More particularly, the invention is directed to a method for treating kerosene. In its more specific aspects, the invention has to do with a treating operation for kerosene to remove undesirable color bodies.

The present invention may be briefly described as a method of producing a kerosene of improved color from a sour kerosene fraction obtained by fractional distillation of crude petroleum. The kerosene fraction treated in accordance with the present invention is characterized by containing organic compounds having carbonyl groups and organic compounds containing hydroxyl groups. The kerosene fraction also contains organic compounds having active methylene groups and contains free sulfur and/or organic polysulfides. The kerosene treated in accordance with the present invention also contains pyrrole and/or its homologues. The kerosene fraction has a pink color when freshly distilled and a Saybolt color not less than +10. This fraction is recovered from the crude petroleum by distillation and is washed in sequence with an aqueous caustic solution and water. The washed kerosene is stored in the presence of a gaseous atmosphere which is substantially free of free oxygen. Subsequently, the fraction after storage is extracted with liquid sulfur dioxide under extraction conditions to remove the undesirable organic compounds and other materials from the kerosene as well as the aromatics. In the present invention the particular feature is excluding the kerosene fraction from contact with any free oxygen from the time it is distilled until it is extracted with sulfur dioxide.

Exclusion of free oxygen from the kerosene may be realized by maintaining an inert gaseous atmosphere over the kerosene during the foregoing treating and storage operations or by maintaining the equipment in which the operations are conducted full of liquid during all times and by maintaining any storage tanks in which the kerosene is stored either liquid full or in the presence of a gaseous atmosphere from which oxygen is excluded.

As examples of the gaseous atmosphere may be mentioned inert gases, such as nitrogen, carbon dioxide and the like, as well as the gaseous hydrocarbon methane. It is undesirable under some conditions to employ hydrocarbons having two to five carbon atoms, such as ethane, propane, butanes and the pentanes in the gaseous atmosphere, since when the system in which the operations are conducted is maintained under pressure, the heavier hydrocarbons may dissolve in the kerosene and interfere with the subsequent extraction with liquid sulfur dioxide.

Certain crude oils such as those contained in the so-called West Texas crudes and which are obtained from various fields as exemplified by the following crude petroleums from the Crane, McElroy, Furhman-Mascho, Goldsmith, Emma, Means, Sand Hill-McKnight, Sand Hill-Tubbs, Cowden South, Midland Farms, McCamey, Big Lake, Foster, Cowden North, Penwell, Cowden Deep, Johnson, Dollarhide-Silurian, Kermit, Dollarhide-Devonian and Wasson fields in West Texas as well as the Hobbs and Eunice-Monument fields in New Mexico and others of a similar nature contain color bodies which appear in the kerosene fraction on distillation. These color bodies are either pink or yellow and have been found to occur in kerosene fractions containing organic compound having carbonyl groups and organic compounds having hydroxyl groups and organic compounds having active methylene groups, such as indene and the like. The kerosene fractions containing color bodies also contain free sulfur and organic polysulfides or materials such as pyrrole and its homologues. The pink color is due to the results of a reaction of a dehydrogenating agent such as elementary sulfur with a pyrrole type of compound in the presence of an organic compound containing an active methylene group, such as indene. The yellow color bodies are predominantly orthohydroxybenzenes and compounds containing carbonyl groups. These pink and yellow chromophores are unstable and react in the presence of free oxygen to form color degradation products which, if allowed to proceed too far, will ultimately appear in the kerosene to some extent after sulfur dioxide extraction. In short, stating this otherwise, after reaction in the presence of free oxygen, the color bodies may not be removed completely from the kerosene by the treating operations.

We have discovered that if free oxygen is excluded from contact with kerosene during its distillation and treatment, the color bodies may be subsequently removed by sulfur dioxide extraction. Therefore, in accordance with the present invention, we maintain the kerosene fraction containing the aforesaid compounds out of contact with free oxygen during the treating operation so that the solvent, such as sulfur dioxide, may remove these compounds and chemicals from the kerosene and allow the production of a kerosene of improved color.

The present invention will be further illustrated by reference to the drawing in which the single figure is a flow diagram of a preferred mode.

Referring now to the drawing, numeral 11 designates a charge line by way of which a crude petroleum, such as one commonly designated as West Texas crude, is introduced into the system from a source, not shown.

Line 11 contains a pump 12 which serves to introduce the crude petroleum into a distillation zone 13 which is shown as a single distillation tower provided with a heating means illustrated by a coil 14 for adjustment of temperature and pressure. It is to be understood, however, that distillation zone 13 may be a plurality of fractional distillation towers to allow segregation of the various fractions of the crude petroleum. It is to be also understood that distillation zone 13 is provided with suitable internal contacting means, such as bell cap trays, distributors and the like, for intimate contact between liquid and vapors. Distillation zone 13 is also provided with all auxiliary equipment usually associated with the modern distillation tower such as means for inducing reflux cooling and condensing means, not shown.

In distillation zone 13 temperatures and pressures are adjusted to remove gasoline and lighter fractions by way of line 15 and to withdraw by way of line 16 the kerosene fractions which may boil within the range of 350° to about 650° F. but preferably boils in the range from 375° to about 625° F. The kerosene fraction passes through a condenser or cooler 17 and is then discharged into an accumulator 18. Accumulator 18 may be a reflux accumulator, especially when the kerosene fraction is withdrawn as vapor by line 16 and liquefied in condenser 17. Under those conditions, it will be desirable to re-introduce a portion of the condensate in accumulator 18 back into tower 13 and this may be conveniently done by withdrawing the kerosene fraction from accumulator 18 by line 19 containing pump 20 and discharging the kerosene into line 21 which leads into zone 13 and into a washing zone 22. By opening valve 21a in line 21 a portion of the kerosene may be discharged into zone 13. If it is not desirable to use the kerosene as reflux then reflux valve 21a may be closed and the kerosene may be introduced by lines 19 and 21 into washing zone 22.

As the kerosene passes through line 21 into zone 22, it is admixed with an aqueous caustic solution having a Baumé gravity in the range from 2 to 20 Baumé, introduced from a source not shown, by line 23. Zone 22 or line 21 downstream from the junction with line 23 may be provided with suitable contacting or mixing means, such as incorporators and the like, to insure contact between the aqueous caustic solution and the kerosene. In any event, in zone 22 a washing action is involved in which the caustic solution causes the removal of caustic-soluble and caustic-reactive compounds contained in the kerosene. The caustic solution used to wash the kerosene may be withdrawn by line 24 and discarded as desired or a portion of the withdrawn caustic solution may be recycled to line 23 by line 25 controlled by valve 26.

It is to be noted that in washing zone 22 the zone is run liquid full to prevent free oxygen from contacting the kerosene. This may also be done by maintaining an inert gaseous atmosphere in zone 22 from which free oxygen is excluded.

In the present operation the zone 22 is run liquid full and the caustic washed kerosene is removed therefrom by line 27 which discharges into a second washing zone 28 which is similar to washing zone 22. Prior to introduction of the caustic washed kerosene into zone 28 it is mixed with water introduced into line 27 by line 29 from a source, not shown. Provision is also made in line 27 or zone 28 for mixing or incorporating means, not shown, for intimate contact of the caustic washed kerosene with the wash water introduced by line 29.

Washing zone 28 like washing zone 22 is run liquid full to exclude free oxygen from contact with the kerosene or if it is desired not to run zone 28 liquid full provision is made to provide an inert gaseous atmosphere above the kerosene in zone 28.

In this instance zone 28 is run liquid full and the water washed kerosene is withdrawn therefrom by line 30 for subsequent treatment as will be described.

The wash water is discharged by line 31 and removed from the system or may be recycled in part to line 29 by way of line 32 controlled by valve 33.

The washed kerosene in line 30 is introduced into a storage zone 34 which is a suitable storage tank in which washed kerosene is indicated generally by the numeral 35 showing a body of kerosene. Above the body of kerosene 35 in zone 34 is an inert gaseous atmosphere indicated generally by numeral 36. This inert gaseous atmosphere is substantially free of free oxygen and hydrocarbons having from 2 to 5 carbon atoms, particularly when the system is operated under pressure.

Provision is made to introduce inert gas into zone 34 by line 37 controlled by valve 38 when kerosene is being removed from zone 34. Likewise, a vent line 39 containing a valve 40 is provided for venting inert gas from zone 34 when kerosene is being introduced thereinto. The kerosene is withdrawn from zone 34 by line 41 and introduced thereby into a sulfur dioxide extraction zone 42. It may be noted that when kerosene is being withdrawn by line 41 into zone 42 at a rate equal to the rate of introduction of kerosene by line 30 it will be necessary only to maintain the inert gaseous atmosphere 36 and valves 38 and 40 may remain in the closed position.

In sulfur dioxide extraction zone 42 there may be a conventional sulfur dioxide extraction operation operated under suitable reaction conditions which may include a temperature in the range from $+10°$ to $-25°$ F. with a volume ratio of sulfur dioxide to kerosene in the range from 0.5:1.0 to 2.0:1.0. In any event a sufficient amount of sulfur dioxide and a suitable temperature are provided in zone 42 to allow extraction of aromatics and undesirable color bodies from the kerosene, the liquid sulfur dioxide being introduced into zone 42 by line 43 to contact countercurrently the kerosene introduced by line 41.

By providing suitable conditions of temperature and ratio of sulfur dioxide and kerosene, an extract phase and a raffinate phase are formed. The raffinate phase, which is substantially free of aromatics and the undesirable color bodies mentioned before, is withdrawn from zone 42 by line 44 and discharged thereby into sulfur dioxide stripper 45 provided with a heating means, such as a heating coil 46, for removal of sulfur dioxide from the raffinate. The sulfur dioxide is withdrawn from stripper 45 by line 47 and may be subjected to liquefaction for further use in the extraction operation. The raffinate is discharged from zone 45 by line 48 for use as a finished kerosene of the improved color.

The extract is discharged from zone 42 by line 49 which introduces the extract into a stripper 50 which is similar to stripper 45 and is provided with a heating means, such as coil 51, for adjustments of temperature and pressure. Under operating conditions, sulfur dioxide is removed from stripper 50 by line 52 for further use in the process after liquefaction. The extract is withdrawn from stripper 50 by line 53 and may be discharged from the system through branch line 54 controlled by valve 55. It may be desirable, however, to recover the color bodies in the kerosene extract and to this end the kerosene extract may be discharged by line 53 on opening valve 56 into a silica gel adsorption tower 57 containing a bed of silica gel indicated by the numeral 58. The adsorption tower is preferably charged with silica gel of relatively low acidity to prevent polymerization of the methylene group containing compounds on contact with the gel. Such a gel is available in commerce (The Davison Chemical Corp., Silica Gel Code No. 950) and is characterized by the fact that, unlike the ordinary gel of higher acidity, it has substantially less tendency to isomerize olefins. The gel may have a particle size in the range from 28 to 200 mesh, e. g. 60 to 200 mesh. Instead of a single tower, a plurality of adsorption towers may be employed in which the chromophore-containing adsorbate from the first tower is charged to a record tower for further concentration.

The chromophores contained in the extract are selectively adsorbed on silica gel. However, to insure purification, it is desirable to wash the silica gel first with benzene which is introduced by line 59 on opening valve 60 to remove paraffins from the silica gel in bed 58, the paraffins being discharged from the zone 57 by line 61 on opening valve 62. Thereafter ethyl alcohol may be introduced into line 59 through line 63 on opening valve 64, valve 60 being closed. This displaces the benzene and the chromophores from the silica gel and allows the solution to be discharged by branch line 65 controlled by valve 66 into a stripper 67 provided with a heating means, such as coil 68, for adjustment of temperature and pressure. The benzene may be removed from the color bodies in stripper 67 by line 69 while the color bodies may be recovered by line 70.

It may be seen from the foregoing description taken with the drawing that we are able to produce a raffinate having a good color in excess of 22+ Saybolt by excluding oxygen from the system during the treating operation. Also by a subsequent treating operation of the extract we are able to recover the color bodies which may suitably be used in chemical manufacture and the like.

In the practice of the present invention, the kerosene introduced into the extraction zone 42 must have a Saybolt color of no less than +10. Actually, the Saybolt color may be in the range from about +10 to +12 but may range upwardly as high as +25. If the color is below the minimum figure given, the kerosene is not amenable to sulfur dioxide extraction and a kerosene of a lower than +22 color is produced as a raffinate which is recovered by line 48. A kerosene of less than +22 color is not marketable in view of the color specification imposed in the industry. Furthermore, kerosene of such a color may degrade further and result in an off-color product.

Operations have been carried out in accordance with the present invention in which a kerosene was treated in accordance with the preferred mode in which oxygen was excluded from contact with the kerosene and the kerosene extracted with the sulfur dioxide. The kerosene was recovered and tested and a +22 Saybolt color was obtained.

To illustrate the nature and mechanism of the color bodies that appear in distillates from West Texas type of sour crudes, a red colored concentrate was obtained by extracting a high sulfur kerosene refined oil having a pink color with liquid sulfur dioxide in an amount of 100% of $SO_2$ at 0° F. The extract which contained substantially all of the pink color material originally present in the high sulfur refined oil was percolated through a bed of 28 to 200 mesh silica gel. Thereafter the bed containing adsorbed color bodies was subjected to desorption with benzene to remove paraffins and then with absolute ethyl alcohol to remove the benzene and pink colored material. The concentrate from this operation was percolated through silica gel having a mesh of 60 to 200. Again, to remove any paraffins from the silica gel, absolute ethyl alcohol was used to displace benzene and red colored chromophores. This concentrate was distilled from the benzene. During all these operations precautionary measures were taken to exclude oxygen from contact with the pink colored chromophores which have been shown to be unstable in the presence of oxygen.

Analysis of the concentrate obtained in this manner showed that it contained hydroxyl and carbonyl type of compounds and a relatively pure ortho hydroxyl benzene. The hydroxyl benzene accounts for the yellow color bodies. The yellow color bodies are not distillable as red chromophores but are distilled as yellow and yellowish-orange compounds.

The pink color bodies which are red in concentrated form may be synthesized by heating a mixture of indole (benzo-pyrole-$C_3C_7N$) and indene ($C_9H_8$) in the presence of elementary sulfur. All three of these constituents are necessary for this reaction to occur. Thus for the production of the red material, it is required that a parent compound, such as indole or other type of pyrrole, be present together with a dehydrogenating agent, such as sulfur, and a substance or material containing an active methylene group, such as indene.

Color bodies produced in this fashion have been added to water white kerosene to produce the characteristic pink color.

To show the effect of an active methylene group and elementary sulfur on indole, quinaldine (2-ethylquinoline-$C_{10}H_7N$) and elementary sulfur were added to a mixture of indole and water white kerosene. Upon heating this mixture, a red colored concentrate was produced; but this concentrate, when added to water white kerosene, did not simulate the pink color naturally occurring in the West Texas type crude oils. Also the pink colored materials resulting from the indole-quinaldine-sulfur reaction distilled at somewhat higher temperature (back end of the kerosene boiling range) than did the indole-indene-sulfur product, which boils in the front end of the kerosene range. This indicates the formation of higher molecular weight compounds in the indole-quinaldine-sulfur reaction and indicates further than the indole-indene-sulfur reaction product typifies the type of compounds which are present in the naturally occurring kerosene fraction to provide the pink color.

The nature and objects of the present invention having been completely described and illustrated, what we desire to claim as new and useful and to secure by Letters Patent is:

1. In the process of producing kerosene of improved color from a sour kerosene fraction, obtained by fractional distillation of crude petroleum, said fraction containing organic compounds having carbonyl groups, organic compounds having hydroxyl groups, organic compounds having active methylene groups, and containing a material selected from the group consisting of free sulfur and organic polysulfides, and a material selected from the group consisting of pyrrole and its homologs, said fraction being characterized by a pink coloration, and by a Saybolt color no less than +10, which process comprises recovering said kerosene fraction from said distillation, washing said recovered kerosene fraction, in sequence, with caustic and water, storing said washed fraction in the presence of a gaseous atmosphere, and subsequently extracting aromatics, said organic compounds, and said materials from said washed kerosene fraction by means of liquid sulfur dioxide, the step of excluding oxygen from any atmosphere with which said kerosene fraction may come into contact from the time the kerosene fraction is recovered by distillation until said extraction with sulfur dioxide has been completed.

2. In the process of producing kerosene of color better than +22 Saybolt from a sour virgin kerosene fraction, obtained by fractional distillation of crude petroleum, said fraction containing organic compounds having carbonyl groups, organic compounds having hydroxyl groups, organic compounds having active methylene groups, and containing a material selected from the group consisting of free sulfur and organic polysulfides, and a material selected from the group of pyrrole and its homologs, said fraction being characterized by a pink coloration, and by a Saybolt color not less than +10, which process comprises recovering said fraction from said distillation, washing said fraction, in sequence, with an aqueous caustic solution and water, storing said fraction in the presence of a gaseous hydrocarbon atmosphere, and subsequently extracting aromatics and said organic compounds and materials from said kerosene fraction by means of liquid sulfur dioxide, the step of excluding oxygen from any atmosphere with which said kerosene fraction may come in contact from the time the kerosene fraction is recovered by distillation until it is charged to said extraction step.

3. In the process of producing kerosene of color better than +22 Saybolt from a sour virgin kerosene fraction, obtained by fractional distillation of crude petroleum in a distillation zone, said fraction containing organic compounds having carbonyl groups, organic compounds having hydroxyl groups, organic compounds having active methylene groups, and containing a material selected from the group consisting of free sulfur and organic polysulfides, and a material selected from the group consisting of pyrrole and its homologs, said fraction being characterized by a pink coloration, and a Saybolt color no less than +10, which process comprises recovering said kerosene fraction from said distillation, washing said recovered kerosene fraction, in sequence, with an aqueous caustic solution and water in washing zones, storing said washed fraction in a storage zone in the presence of a gaseous atmosphere, and subsequently extracting aromatics and said organic compounds and materials from said washed fraction with liquid sulfur dioxide under extraction conditions in an extraction zone, the step of excluding free oxygen from contact with said kerosene fraction in said zones from the time it is recovered from said distillation zone to the time it is charged to said extraction zone.

4. A process in accordance with claim 3 in which oxygen is excluded from contact with the kerosene fraction by providing in said gaseous atmosphere an atmosphere of inert gas substantially free of free oxygen and substantially free of hydrocarbons having from 2 to 5 carbon atoms.

5. A process in accordance with claim 3 in which oxygen is excluded from contact with the kerosene fraction by maintaining said washing and extraction zones liquid full and by providing in said gaseous atmosphere an atmosphere of inert gas substantially free of free oxygen and substantially free of hydrocarbons having from 2 to 5 carbon atoms.

6. A method for producing a kerosene of improved color which comprises washing a kerosene fraction distilled from crude petroleum and containing organic compounds having carbonyl groups, organic compounds having hydroxyl groups, organic compounds having active methylene groups and containing a material selected from the group consisting of free sulfur and organic polysulfides and a material selected from the group consisting of pyrrole and its homologues, said kerosene being characterized by a pink coloration and having a Saybolt color in the range of about +10 to about +15 and being sour to the doctor test in sequence with an aqueous caustic solution and water in washing zones, storing said washed fraction in a storage zone in the presence of a gaseous atmosphere, subsequently extracting aromatics and said organic compounds and materials from said washed kerosene with liquid sulfur dioxide under extraction conditions in an extraction zone, and excluding free oxygen from contact with said kerosene in said zones during said washing and extraction operations.

7. A process in accordance with claim 6 in which the oxygen is excluded from contact with the kerosene by providing in said gaseous atmosphere an atmosphere of inert gas substantially free of oxygen and substantially free of hydrocarbons having from 2 to 5 carbon atoms.

8. A process in accordance with claim 6 in which the oxygen is excluded from contact with kerosene by maintaining said washing and extraction zones liquid full and providing in said gaseous atmosphere an atmosphere of inert gas substantially free of oxygen.

9. A method of removing color bodies from a kerosene fraction distilled from crude petroleum and containing organic compounds having carbonyl groups, organic compounds having hydroxyl groups, organic compounds having active methylene groups and containing a material selected from the group consisting of free sulfur and organic polysulfides, and a material selected from the group consisting of pyrrole and its homologues, said kerosene being characterized by a pink coloration, which comprises washing said kerosene in sequence with an aqueous caustic solution and water in washing zones, subsequently extracting aromatics and said organic compounds and materials from said washed fraction with liquid sulfur dioxide under extraction conditions in an extraction zone to form a raffinate phase and an extract phase, recovering separately said raffinate phase and said extract phase substantially free of sulfur dioxide, contacting said recovered extract phase in an adsorption zone with silica gel under conditions to adsorb selectively on said silica gel color bodies contributing to said pink coloration in said kerosene, excluding free oxygen from contact with said kerosene in said zones, and recovering said color bodies from said silica gel.

10. A method of removing color bodies from a kerosene fraction distilled from crude petroleum and containing organic compounds having carbonyl groups, organic compounds having hydroxyl groups, organic compounds having active methylene groups and containing a material selected from the group consisting of free sulfur and organic polysulfides, and a material selected from the group consisting of pyrrole and its homologues, said kerosene being characterized by a pink coloration, which comprises washing said kerosene in sequence with an aqueous caustic solution and water in washing zones, subsequently extracting aromatics and said organic compounds and materials from said washed fraction with liquid sulfur dioxide under extraction conditions in an extraction zone to form a raffinate phase and an extract phase, recovering separately said raffinate phase and said extract phase substantially free of sulfur dioxide, and excluding free oxygen from contact with said kerosene in said zones.

References Cited in the file of this patent

UNITED STATES PATENTS

| | | |
|---|---|---|
| 2,053,752 | Vobach et al. | Sept. 8, 1936 |
| 2,402,425 | Meyer | June 18, 1946 |
| 2,525,152 | Strickland et al. | Oct. 10, 1950 |
| 2,651,594 | Blatz | Sept. 8, 1953 |

OTHER REFERENCES

Dunstan et al.: The Science of Petroleum, vol. IV (1938), page 2474, Oxford University Press, New York.